US008625224B1

(12) United States Patent
Lin et al.

(10) Patent No.: US 8,625,224 B1
(45) Date of Patent: Jan. 7, 2014

(54) CHARACTERIZING MAGNETIC RECORDING PARAMETERS OF A DISK DRIVE BY EVALUATING TRACK PROFILE OF DUAL MICROTRACKS

(75) Inventors: Enhao Lin, Union City, CA (US); Shaoping Li, San Ramon, CA (US); Tao Pan, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 69 days.

(21) Appl. No.: 13/464,724

(22) Filed: May 4, 2012

(51) Int. Cl.
    *G11B 5/02* (2006.01)

(52) U.S. Cl.
    USPC .............................. 360/55; 360/18

(58) Field of Classification Search
    None
    See application file for complete search history.

(56) References Cited

U.S. PATENT DOCUMENTS

| | | |
|---|---|---|
| 4,513,333 A | 4/1985 | Young et al. |
| 4,516,165 A | 5/1985 | Cunningham et al. |
| 5,600,500 A | 2/1997 | Madsen et al. |
| 5,687,036 A | 11/1997 | Kassab |
| 5,691,857 A | 11/1997 | Fitzpatrick et al. |
| 5,812,337 A | 9/1998 | Tanaka et al. |
| 6,028,731 A | 2/2000 | Bond |
| 6,101,053 A | 8/2000 | Takahashi |
| 6,166,536 A | 12/2000 | Chen et al. |
| 6,252,731 B1 | 6/2001 | Sloan et al. |
| 6,265,868 B1 | 7/2001 | Richter |
| 6,445,521 B1 | 9/2002 | Schaff et al. |
| 6,476,992 B1 | 11/2002 | Shimatani |
| 6,525,892 B1 | 2/2003 | Dunbar et al. |
| 6,680,609 B1 | 1/2004 | Fang et al. |
| 6,765,379 B1 | 7/2004 | Marshall et al. |
| 6,791,775 B2 | 9/2004 | Li et al. |
| 6,870,697 B2 | 3/2005 | Ikekame et al. |
| 6,909,566 B1 | 6/2005 | Zaitsu et al. |
| 6,914,738 B2 | 7/2005 | Fujiwara et al. |
| 6,995,933 B1 | 2/2006 | Codilian et al. |
| 7,095,577 B1 | 8/2006 | Codilian et al. |
| 7,119,537 B2 | 10/2006 | Che et al. |
| 7,170,700 B1 * | 1/2007 | Lin et al. .................. 360/31 |
| 7,203,023 B2 | 4/2007 | Kuroda et al. |
| 7,227,708 B2 * | 6/2007 | Feng .......................... 360/31 |
| 7,529,050 B2 | 5/2009 | Shen et al. |
| 7,567,397 B2 | 7/2009 | Lu |
| 7,667,933 B2 | 2/2010 | Kudo et al. |

(Continued)

OTHER PUBLICATIONS

Enhao Ed Lin, et al., "High Precision Erase Band Measurement With Four Written Tracks", IEEE Transactions on Magnetics, vol. 47, No. 10, Oct. 2011, pp. 2984-2987.

(Continued)

*Primary Examiner* — Thang Tran

(57) ABSTRACT

A disk drive is disclosed comprising a head actuated over a disk comprising a plurality of tracks. The head is positioned over a track minus a first delta and a first frequency pattern is written at a first frequency. The head is positioned over the track plus a second delta and a second frequency pattern is written at a second frequency different from the first frequency. After writing the first frequency pattern and second frequency pattern, a third frequency pattern is written substantially centered on the track at a third frequency. After writing the third frequency pattern, the head is scanned across the track while reading the disk to generate a read signal. A first frequency component is extracted from the read signal representing the first frequency, and a second frequency component is extracted from the read signal representing the second frequency.

42 Claims, 7 Drawing Sheets

(56) References Cited

U.S. PATENT DOCUMENTS

| | | |
|---|---|---|
| 7,706,096 B2 | 4/2010 | Ito et al. |
| 7,729,071 B2 | 6/2010 | Harada |
| 7,843,658 B2 | 11/2010 | Kiyono |
| 7,907,361 B2 | 3/2011 | Deng et al. |
| 7,982,989 B1 | 7/2011 | Shi et al. |
| 2004/0010391 A1 | 1/2004 | Cheng-I Fang et al. |
| 2004/0075931 A1 | 4/2004 | Kim et al. |
| 2004/0080845 A1 | 4/2004 | Yeo et al. |
| 2006/0098318 A1 | 5/2006 | Feng |

OTHER PUBLICATIONS

Juan Fernandez-De-Castro, et al., "Measuring and Understanding Write Width and Off-Track as a Function of Linear Density in Perpendicular Recording", JAP, 111, 07B702 (2012).

Juan Fernandez-De-Castro, et al., "Charaterization of the Reader Width Using the Micro-Track Test in Perpendicular Recording", IEEE Transactions on Magnetics, vol. 48, No. 7, Jul. 2012, pp. 2158-2160.

* cited by examiner

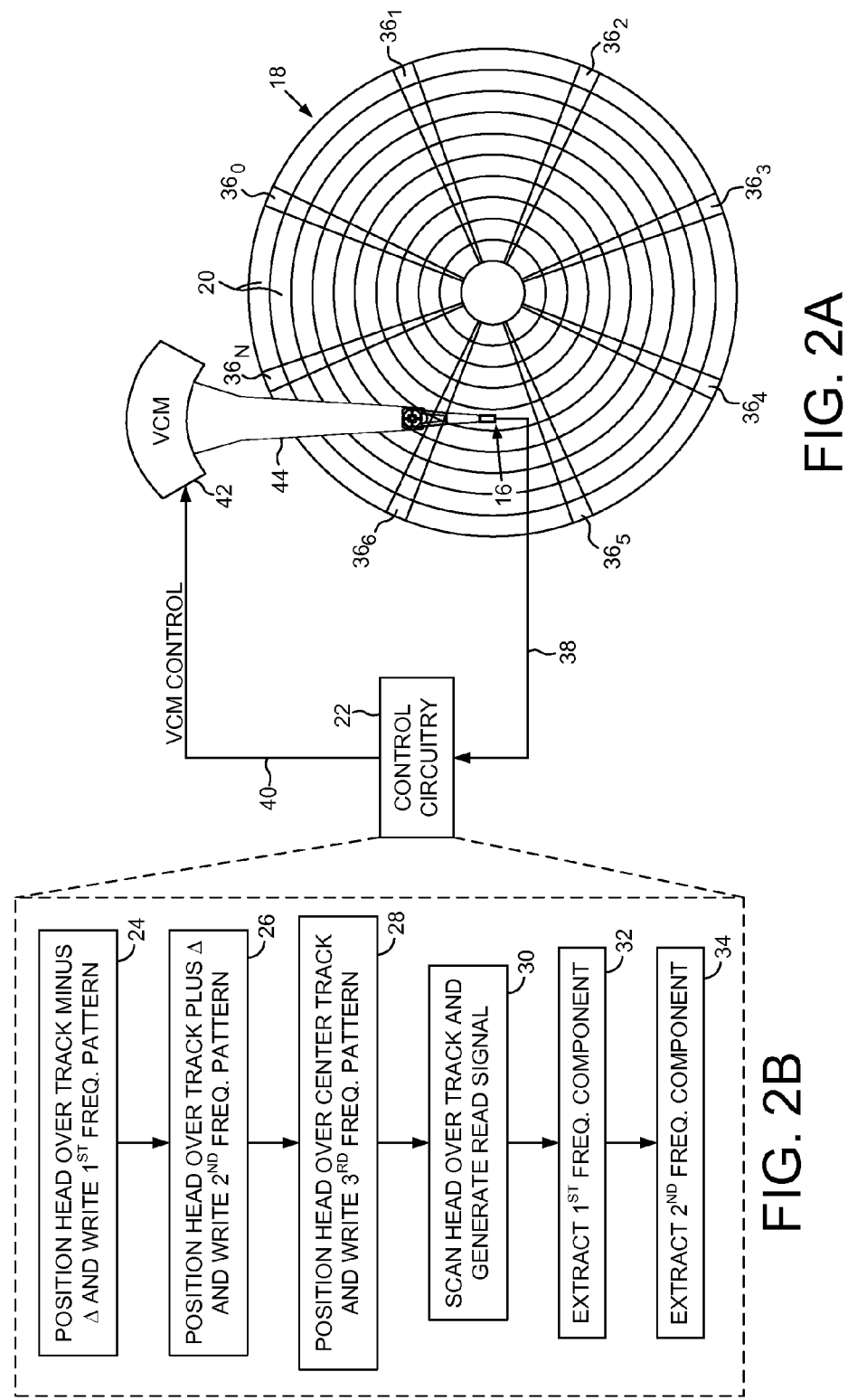

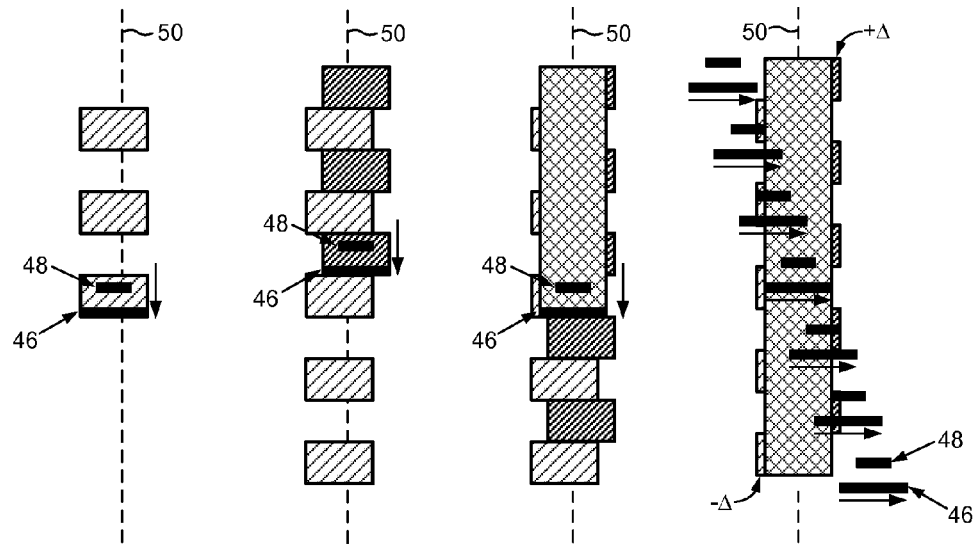
FIG. 6A    FIG. 6B    FIG. 6C    FIG. 6D
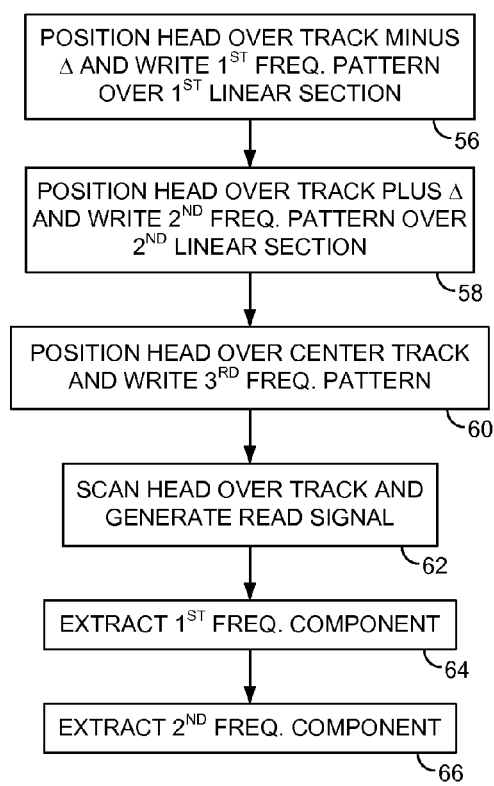
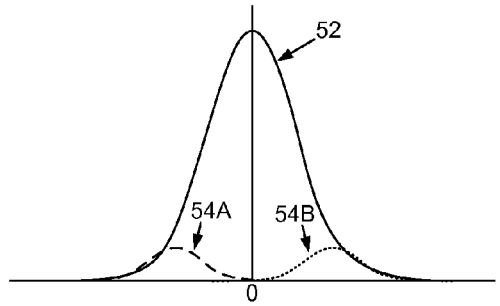
FIG. 6E
FIG. 7

US 8,625,224 B1

CHARACTERIZING MAGNETIC RECORDING PARAMETERS OF A DISK DRIVE BY EVALUATING TRACK PROFILE OF DUAL MICROTRACKS

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

FIG. 1 shows a prior art disk format 2 as comprising a number of servo tracks 6 defined by servo sectors $4_0$-$4_N$ recorded around the circumference of each servo track. Each servo sector 4, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector 4, further comprises groups of servo bursts 14 (A,B,C,D in the example shown), which are recorded with precise intervals and offsets relative to the track centerlines. The servo bursts 14 provide fine head position information used for centerline tracking while accessing a data track during write/read operations.

BRIEF DESCRIPTION OF THE DRAWINGS

FIG. 2A shows a disk drive according to an embodiment of the present invention comprising a head actuated over a disk comprising a plurality of tracks.

FIG. 2B is a flow diagram according to an embodiment of the present invention wherein a first frequency pattern is written at a minus delta from a track, a second frequency pattern is written at a plus delta from the track at a different frequency, and a third frequency pattern is written substantially centered on the track.

FIGS. 6A-6E illustrate an embodiment of the present invention wherein first and second frequency patterns are written in an interleaved manner along the track.

FIG. 7 is a flow diagram corresponding to the embodiment of the present invention wherein first and second frequency patterns are written in an interleaved manner along the track.

DETAILED DESCRIPTION

Figure 1:
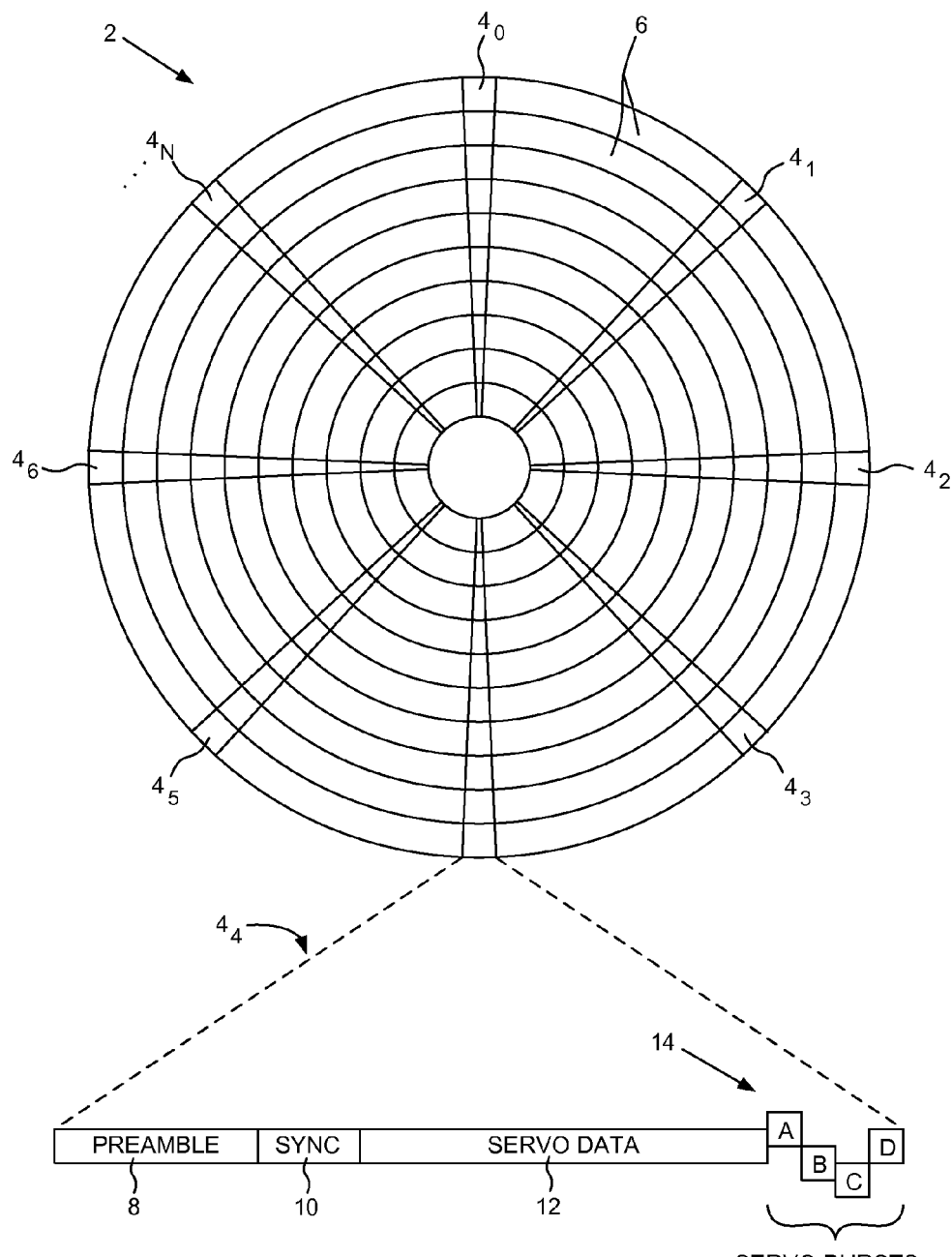
FIG. 1 shows a prior art disk format comprising a plurality of servo tracks defined by embedded servo sectors.

FIG. 2A shows a disk drive according to an embodiment of the present invention comprising a head 16 actuated over a disk 18 comprising a plurality of tracks 20. The disk drive further comprises control circuitry 22 operable to execute the flow diagram of FIG. 2B, wherein the head is positioned over a track minus a first delta and a first frequency pattern is written at a first frequency (block 24). The head is positioned over the track plus a second delta and a second frequency pattern is written at a second frequency different from the first frequency (block 26). After writing the first frequency pattern and second frequency pattern, a third frequency pattern is written substantially centered on the track at a third frequency (block 28). After writing the third frequency pattern, the head is scanned across the track while reading the disk to generate a read signal (block 30). A first frequency component is extracted from the read signal representing the first frequency (block 32), and a second frequency component is extracted from the read signal representing the second frequency (block 34).

In the embodiment of FIG. 2A, the disk 18 comprises embedded servo sectors $36_0$-$36_N$ that define the tracks 20. The control circuitry 22 processes a read signal 38 emanating from the head 16 to demodulate the servo sectors $36_0$-$36_N$ and generate a position error signal (PES) representing an error between the actual position of the head and a target position relative to a target track. The control circuitry 22 filters the PES using suitable compensation filters to generate a control signal 40 applied to a voice coil motor (VCM) 42 which rotates an actuator arm 44 about a pivot, thereby actuating the head 16 radially over the disk 18 in a direction that reduces the PES. The servo sectors $36_0$-$36_N$ may comprise any suitable position information, such as a track address for coarse positioning and servo bursts for fine positioning as described above with reference to FIG. 1. The servo bursts may comprise any suitable pattern, such as an amplitude based servo pattern as shown in FIG. 1, or a suitable phase based servo pattern.

Figures 3A, 3B, 3C, 3D:
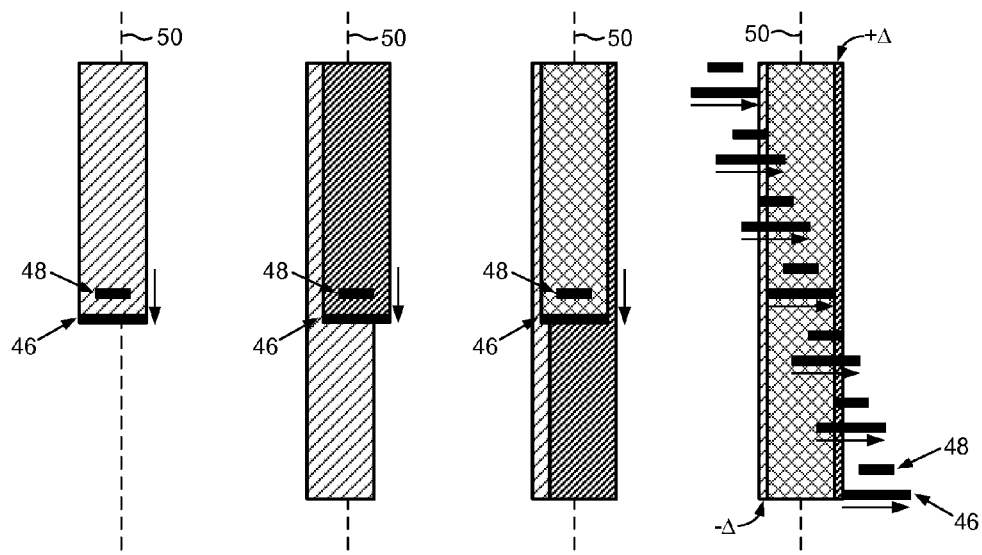
FIGS. 3A-3E illustrate an embodiment of the present invention wherein after writing the first, second, and third frequency patterns, the head is scanned across the track to generate a track profile comprising microtrack side pulses and a center pulse.
Figure 3E:
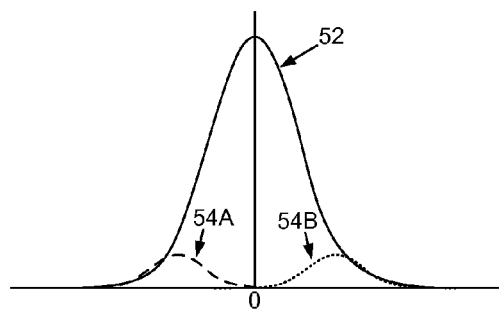

FIGS. 3A-3D graphically illustrate the flow diagram of FIG. 2B, wherein the head 16 comprises a write element 46 and a read element 48. The read element 48 is used to read the servo sectors $36_0$-$36_N$ in order to position the write element 46 over a track 50 minus a first delta (−Δ) while writing the first frequency pattern at the first frequency during a first revolution of the disk as illustrated in FIG. 3A. During a second revolution of the disk, the write element 46 is positioned over the track 50 plus a second delta (+Δ) while writing the second frequency pattern at the second frequency as shown in FIG. 3B. In one embodiment, the second frequency may be higher than the first frequency by any suitable amount, and in another embodiment, the first frequency may be higher than the second frequency by any suitable amount. During a third revolution of the disk, the write element 46 is positioned over the center of the track 50 while writing the third frequency pattern at the third frequency as shown in FIG. 3C. In one embodiment, the third frequency is between the first frequency and the second frequency. After writing the third frequency pattern, the read element 48 is scanned across the track 50 while reading the track as illustrated in FIG. 3D in order to generate a track profile as shown in FIG. 3E. In one embodiment, the read element 48 is scanned across the track 50 in a single operation without repositioning the read element 48 in order to generate the read signal.

The track profile in the embodiment shown in FIG. 3E comprises a center pulse 52 with a peak at the center of the track that is generated by filtering the read signal in order to extract the third frequency component representing the third frequency. The track profile also comprises a first microtrack side pulse 54A on a first side of the track and a second microtrack side pulse 54B on a second side of the track, wherein the first and second microtrack side pulses represent a signal strength of the read signal at the first and second frequencies. The first and second microtrack side pulses 54A and 54B of the track profile are generated by filtering the read signal in order extract the first and second frequency components, respectfully. The first and second microtrack side pulses 54A and 54B are smaller in amplitude than the center pulse as they represent the residual signal of the first frequency pattern and the second frequency pattern after having been partially overwritten by the third frequency pattern (leaving the two microtracks).

In the embodiment of FIG. 3D, the first delta (−Δ) is substantially equal to the second delta (+Δ); however, in other embodiments the first delta may be different than the second delta by any suitable amount. In one embodiment, at least one of the first and second deltas is less than the width of the read element 48, and in one embodiment at least one of the first and second deltas is less than half the width of the read element 48. Writing the first and/or second frequency pattern offset by a small delta from the center of the track, and then overwriting the first and second frequency patterns with the third frequency pattern results in at least one narrow microtrack as illustrated in FIG. 3D. Because the first and second frequency patterns are written at different frequencies, the intertrack interference between the microtracks (at the respective frequencies) is reduced when scanning the head across the track and extracting the first and second frequency components to generate the first and second microtrack side pulses 54A and 54B in the track profile of FIG. 3E.

Figure 4A:
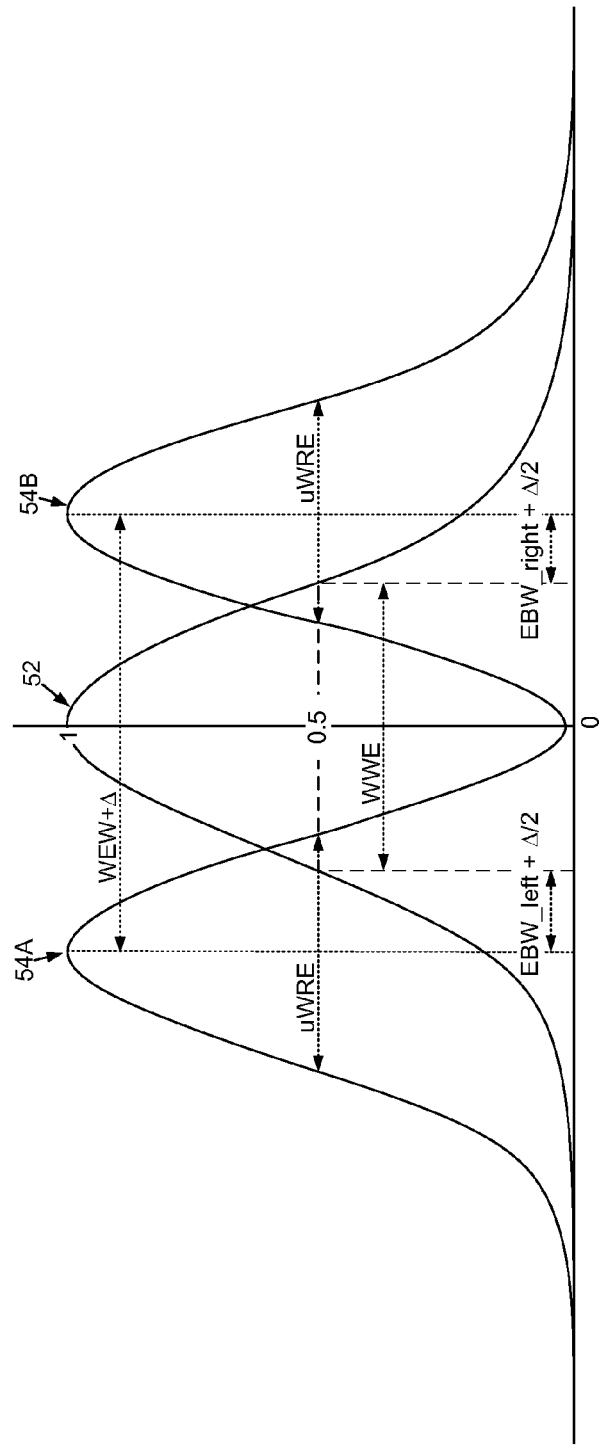
FIGS. 4A-4B show various magnetic recording parameters estimated in response to the track profile according to an embodiment of the present invention.

In one embodiment, the well defined, narrow microtrack side pulses 54A and 54B in the track profile enables a more accurate estimate of various magnetic recording parameters. FIG. 4A (a normalized track profile corresponding to FIG. 3E) illustrates various magnetic recording parameters that may be estimated according to embodiments of the present invention. In one embodiment, a microtrack width of the read element (uWRE) may be estimated based on the width of at least one of the microtrack side pulses 54A and 54B, and in one embodiment, the uWRE may be estimated as the average between the widths of two microtrack side pulses 54A and 54B. In another embodiment, a width of the write element (WWE) may be estimated based on the width of the center pulse. A write and erase width (WEW) may be estimated based on a distance between the first and second side pulses, wherein in one embodiment a radial offset between the write element and the read element may be estimated based on the WEW. FIG. 4A also shows an erase band width (EBW) estimated based on the difference between the center of each microtrack side pulse and the corresponding width of the write element (WWE) on each side of the track.

Figure 4B:
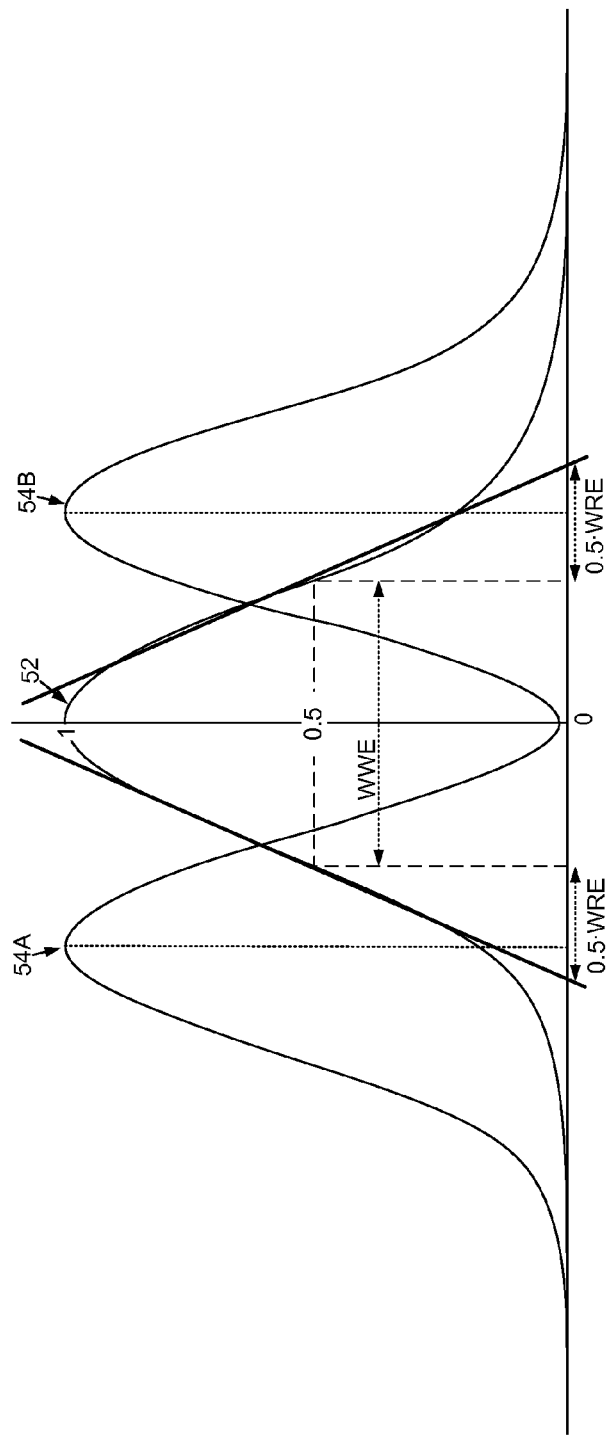

FIG. 4B shows an embodiment of the present invention wherein the width of the read element (WRE) may be estimated based on a slope of the center pulse. As shown in FIG. 4B, the WRE is estimated as the distance between the x-axis intercepts of the center pulse slopes minus the WWE. The WRE is typically a wider estimate than the actual width of the read element due to a side reading effect that manifests when reading the wider center track. The uWRE shown in FIG. 4A is typically a more accurate estimate of the actual width of the read element due to the narrow width of the microtracks. In one embodiment, an adjusted width of the write element (WWE') is estimated based on the WWE, the uWRE, and the WRE. For example, in one embodiment the WWE' is estimated by subtracting a side reading width (SRW) from the WWE, where the SRW is the difference between the WRE and the uWRE.

Figure 5:
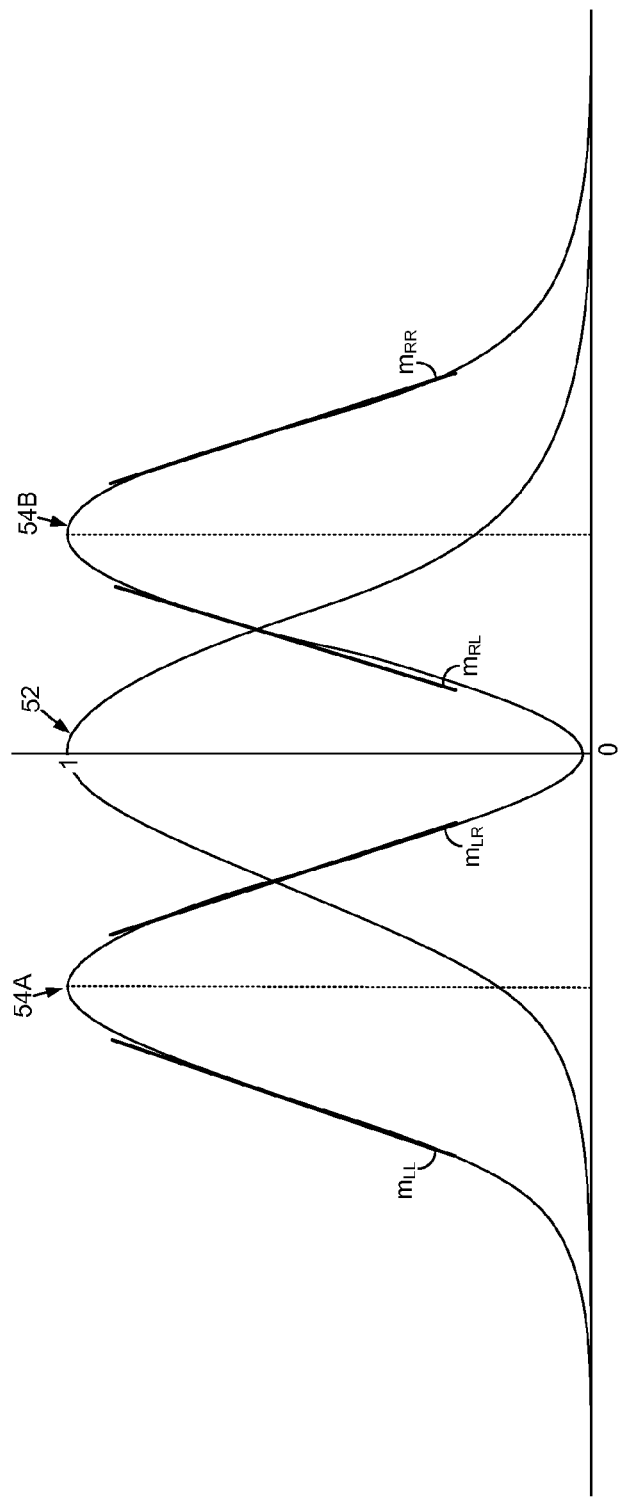
FIG. 5 shows an embodiment of the present invention wherein the asymmetrical slopes of first and second microtrack side pulses are compensated when estimating the magnetic recording parameters.

Ideally, the uWRE estimated based on the left microtrack side pulse 54A should equal the uWRE estimated based on the right microtrack side pulse 54B since they are measured with the same reader. Referring to FIG. 5, the slopes of left side of the left microtrack, right side of the left microtrack, left slope of the right microtrack, and right slope of the right microtrack are denoted as $m_{LL}$, $m_{LR}$, $m_{RL}$, and $m_{RR}$, respectively. If the writing and reading are symmetric, and the overwrite is sufficient, the slopes on the same side of the two microtracks should be approximately equivalent:

$$m_{LL} \approx m_{RL}$$

$$m_{LR} \approx m_{RR}$$

If the head is too weak to overwrite the back tracks sufficiently, there are excessive residuals left on the right skirt of the left microtrack and on the left skirt of the right microtrack, and the slopes $m_{LR}$ and $m_{RL}$ will be smaller than the expected values, that is:

$$|m_{RL}| < |m_{LL}|$$

$$|m_{LR}| < |m_{RR}|$$

In this case, $uWRE_L$ and $uWRE_R$ can be adjusted in the following way:

$$\delta_L = \frac{(TAA_L - NF_L)}{2} * \left( \frac{1}{|m_{LR}|} - \frac{1}{|m_{RR}|} \right)$$

$$\delta_R = \frac{(TAA_R - NF_R)}{2} * \left( \frac{1}{|m_{RL}|} - \frac{1}{|m_{LL}|} \right)$$

$$uWRE'_L = uWRE_L - \delta_L$$

$$uWRE'_R = uWRE_R - \delta_R$$

where, $TAA_L$ and $TAA_R$ are the peak amplitude of the left and right microtracks,
$NF_L$ and $NF_R$ are the noise floor of the left and right microtracks.

After the above side reading adjustment, $uWRE_L'$ and $uWRE_R'$ should be equivalent and an adjusted uWRE' may be estimated as the average of the two:

$$uWRE' = (uWRE'_L + uWRE'_R)/2$$

Due to the dual microtrack approach, in one embodiment the above estimate can be verified by comparing the initially measured uWRE and the side slopes of the two microtracks. In other embodiments, a more sophisticated adjustment algorithm may be derived by correlating the two microtracks. In extraordinary cases, retest or test conditions (writing and erasing) adjustment can be automatically triggered by correlating the two microtracks.

In one embodiment, an adjusted WEW' can be estimated by adjusting the initial WEW accordingly:

$$WEW' = WEW + \delta_L/2 + \delta_R/2$$

If the fore track is optionally scanned, the following parameters may also be adjusted: WWE, WRE, read write offset (RWO). In one embodiment, the off-track read capability (OTRC) can also be measured, where OTRC is 50% of the difference between WWE and WRE without side reading adjustment. In another embodiment, the relative EBW (denoted as EW) can be estimated according to:

$$EW = WEW' - WWE'$$

where EW is a good indicator of the overwrite capability of head/media.

FIGS. 6A-6D illustrate another embodiment of the present invention which is further understood with reference to the flow diagram of FIG. 7. The head is positioned over a track minus a first delta and a first frequency pattern is written at a first frequency over a first linear section of the track (block 56). The head is positioned over the track plus a second delta and a second frequency pattern is written over a second linear section of the track different from the first linear section (block 58). After writing the first frequency pattern and second frequency pattern, a third frequency pattern is written substantially centered on the track at a third frequency, wherein the third frequency pattern overwrites at least part of the first and second frequency patterns (block 60). After writing the third frequency pattern, the head is scanned across the track while reading the disk to generate a read signal (block 62). A first frequency component is extracted from the read signal representing the first frequency (block 64), and a second frequency component is extracted from the read signal representing the second frequency (block 66).

In the example embodiment shown in FIGS. 6A and 6B, the first frequency pattern is written along a number of linear sections separated by a gap, and the second frequency pattern is written within the gap so that the first and second frequency patterns are written in an interleaved manner. Each linear section may comprise any suitable length, such as a data sector, multiple data sectors, or a data wedge (area between consecutive servo sectors). The third frequency pattern is then written in a continuous manner so as to overwrite at least part of the first and second frequency patterns as shown in FIG. 6C. The head is then scanned across the track 50 as shown in FIG. 6D and the frequency components of the first and second frequency patterns are extracted from the read signal to generate a track profile (e.g., as shown in FIG. 6E). In one embodiment, when extracting each frequency component of the first and second frequency patterns, the part of the read signal representing the corresponding linear segment that was written is processed, and the part of the read signal representing the gap between each linear segment is ignored.

In one embodiment, when writing the first and second frequency patterns in an interleaved manner, the first frequency may be different from the second frequency as described above. In an alternative embodiment, the first frequency may substantially equal the second frequency when writing the first frequency pattern and the second frequency pattern in an interleaved manner. In either embodiment, the third frequency of the third frequency pattern is different from the first and second frequencies of the first and second frequency patterns.

In the embodiments wherein the first frequency of the first frequency pattern is different from the second frequency of the second frequency pattern, the difference between the frequencies may be any suitable amount. In one embodiment, the difference between the frequencies is selected so as to provide sufficient separation in the frequency spectrum generated when processing the read signal (e.g., using a discrete Fourier transform).

In the embodiments shown in FIGS. 3E and 6E, the track profile is shown as comprising a center pulse 52 together with the microtrack side pulses 54A and 54B. However, depending on which magnetic recording parameters are estimated, it may not be necessary to generate the center pulse 52 track profile. That is, a magnetic recording parameter may be estimated based on the microtrack side pulses 54A and 54B without needing to generate the center pulse 52 track profile.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of tracks;
   a head actuated over the disk; and
   control circuitry configured to:
      position the head over a track minus a first delta and write a first frequency pattern at a first frequency;
      position the head over the track plus a second delta and write a second frequency pattern at a second frequency different from the first frequency;
      after writing the first frequency pattern and second frequency pattern, write a third frequency pattern substantially centered on the track at a third frequency;
      after writing the third frequency pattern, scan the head across the track while reading the disk to generate a read signal;
      extract a first frequency component from the read signal representing the first frequency; and
      extract a second frequency component from the read signal representing the second frequency.

2. The disk drive as recited in claim 1, wherein the control circuitry is further configured to extract a third frequency component from the read signal representing the third frequency.

3. The disk drive as recited in claim 1, wherein the third frequency is between the first and second frequency.

4. The disk drive as recited in claim 1, wherein the control circuitry is further configured to:
   extract the first frequency component by generating a first microtrack side pulse on a first side of the track, wherein the first side pulse represents a signal strength of the read signal at the first frequency; and
   extract the second frequency component by generating a second microtrack side pulse on a second side of the track, wherein the second side pulse represents a signal strength of the read signal at the second frequency.

5. The disk drive as recited in claim 4, wherein:
the head comprises a write element and a read element; and
the control circuitry is further configured to estimate a magnetic recording parameter in response to the first and second microtrack side pulses.

6. The disk drive as recited in claim 5, wherein the control circuitry is further configured to estimate a microtrack width of the read element (uWRE) in response to at least one of the first and second microtrack side pulses.

7. The disk drive as recited in claim 6, wherein the control circuitry is further configured to estimate the uWRE based on a width of at least one of the first and second microtrack side pulses.

8. The disk drive as recited in claim 7, wherein the control circuitry is further configured to:
extract a third frequency component from the read signal representing the third frequency by generating a center pulse substantially centered on the track;
estimate a width of the write element (WWE) based on a width of the center pulse;
estimate a width of the read element (WRE) based on a slope of the center pulse.

9. The disk drive as recited in claim 8, wherein the control circuitry is further configured to estimate an adjusted width of the write element (WWE') based on the WWE, the uWRE and the WRE.

10. The disk drive as recited in claim 5, wherein the control circuitry is further configured to estimate a write and erase width (WEW) based on a distance between the first and second side pulses.

11. The disk drive as recited in claim 10, wherein the control circuitry is further configured to estimate a radial offset between the write element and the read element based on the WEW.

12. The disk drive as recited in claim 5, wherein the control circuitry is further configured to:
estimate a first slope of a first side of the first side pulse;
estimate a second slope of a second side of the second side pulse; and
estimate the magnetic recording parameter in response to the first and second slopes.

13. The disk drive as recited in claim 1, wherein the control circuitry is further configured to scan the head across the track in a single operation without repositioning the head in order to generate the read signal.

14. A disk drive comprising:
a disk comprising a plurality of tracks;
a head actuated over the disk, wherein the head comprises a read element and a write element; and
control circuitry configured to:
position the head over a track minus a first delta and write a first frequency pattern at a first frequency;
position the head over the track plus a second delta and write a second frequency pattern at a second frequency;
after writing the first frequency pattern and second frequency pattern, write a third frequency pattern substantially centered on the track at a third frequency;
after writing the third frequency pattern, scan the head across the track while reading the disk to generate a read signal;
extract a first frequency component from the read signal representing the first frequency; and
extract a second frequency component from the read signal representing the second frequency,
wherein at least one of the first delta and the second delta is less than a width of the read element.

15. The disk drive as recited in claim 14, wherein at least one of the first delta and the second delta is less than half the width of the read element.

16. The disk drive as recited in claim 14, wherein at least one of the first delta and the second delta is less than half a write and erase width (WEW).

17. The disk drive as recited in claim 14, wherein the first frequency substantially equals the second frequency.

18. The disk drive as recited in claim 14, wherein the first frequency is substantially different from the second frequency.

19. A disk drive comprising:
a disk comprising a plurality of servo sectors that define a plurality of tracks;
a head actuated over the disk; and
control circuitry configured to:
position the head over a track minus a first delta and write a first frequency pattern at a first frequency over a first linear section of the track;
position the head over the track plus a second delta and write a second frequency pattern at a second frequency over a second linear section of the track different from the first linear section;
after writing the first frequency pattern and second frequency pattern, write a third frequency pattern substantially centered on the track at a third frequency, wherein the third frequency pattern overwrites at least part of the first and second frequency patterns;
after writing the third frequency pattern, scan the head across the track while reading the disk to generate a read signal;
extract a first frequency component from the read signal representing the first frequency; and
extract a second frequency component from the read signal representing the second frequency.

20. The disk drive as recited in claim 19, wherein the first frequency substantially equals the second frequency.

21. The disk drive as recited in claim 19, wherein the first frequency is different from the second frequency.

22. A method of operating a disk drive, the disk drive comprising a head actuated over a disk comprising a plurality of tracks, the method comprising:
positioning the head over a track minus a first delta and writing a first frequency pattern at a first frequency;
positioning the head over the track plus a second delta and writing a second frequency pattern at a second frequency different from the first frequency;
after writing the first frequency pattern and second frequency pattern, writing a third frequency pattern substantially centered on the track at a third frequency;
after writing the third frequency pattern, scanning the head across the track while reading the disk to generate a read signal;
extracting a first frequency component from the read signal representing the first frequency; and
extracting a second frequency component from the read signal representing the second frequency.

23. The method as recited in claim 22, further comprising extracting a third frequency component from the read signal representing the third frequency.

24. The method as recited in claim 22, wherein the third frequency is between the first and second frequency.

25. The method as recited in claim 22, further comprising:
extracting the first frequency component by generating a first microtrack side pulse on a first side of the track, wherein the first side pulse represents a signal strength of the read signal at the first frequency; and extracting the second frequency component by generating a second microtrack side pulse on a second side of the track, wherein the second side pulse represents a signal strength of the read signal at the second frequency.

26. The method as recited in claim 25, wherein:
the head comprises a write element and a read element; and
the method further comprises estimating a magnetic recording parameter in response to the first and second microtrack side pulses.

27. The method as recited in claim 26, further comprising estimating a microtrack width of the read element (uWRE) in response to at least one of the first and second microtrack side pulses.

28. The method as recited in claim 27, further comprising estimating the uWRE based on a width of at least one of the first and second microtrack side pulses.

29. The method as recited in claim 28, further comprising:
extracting a third frequency component from the read signal representing the third frequency by generating a center pulse substantially centered on the track;
estimating a width of the write element (WWE) based on a width of the center pulse;
estimating a width of the read element (WRE) based on a slope of the center pulse.

30. The method as recited in claim 29, further comprising estimating an adjusted width of the write element (WWE') based on the WWE, the uWRE and the WRE.

31. The method as recited in claim 26, further comprising estimating a write and erase width (WEW) based on a distance between the first and second side pulses.

32. The method as recited in claim 31, further comprising estimating a radial offset between the write element and the read element based on the WEW.

33. The method as recited in claim 26, further comprising:
estimating a first slope of a first side of the first side pulse;
estimating a second slope of a second side of the second side pulse; and
estimating the magnetic recording parameter in response to the first and second slopes.

34. The method as recited in claim 22, further comprising scanning the head across the track in a single operation without repositioning the head in order to generate the read signal.

35. A method of operating a disk drive, the disk drive comprising, a disk comprising a plurality of tracks, and a head actuated over the disk, wherein the head comprises a read element and a write element, the method comprising:
positioning the head over a track minus a first delta and writing a first frequency pattern at a first frequency;
positioning the head over the track plus a second delta and writing a second frequency pattern at a second frequency;
after writing the first frequency pattern and second frequency pattern, writing a third frequency pattern substantially centered on the track at a third frequency;
after writing the third frequency pattern, scanning the head across the track while reading the disk to generate a read signal;
extracting a first frequency component from the read signal representing the first frequency; and
extracting a second frequency component from the read signal representing the second frequency,
wherein at least one of the first delta and the second delta is less than a width of the read element.

36. The method as recited in claim 35, wherein at least one of the first delta and the second delta is less than half the width of the read element.

37. The method as recited in claim 35, wherein at least one of the first delta and the second delta is less than half a write and erase width (WEW).

38. The method as recited in claim 35, wherein the first frequency substantially equals the second frequency.

39. The method as recited in claim 35, wherein the first frequency is different from the second frequency.

40. A method of operating a disk drive, the disk drive comprising a head actuated over a disk comprising a plurality of servo sectors that define a plurality of tracks, the method comprising:
positioning the head over a track minus a first delta and writing a first frequency pattern at a first frequency over a first linear section of the track;
positioning the head over the track plus a second delta and writing a second frequency pattern at a second frequency over a second linear section of the track different from the first linear section;
after writing the first frequency pattern and second frequency pattern, writing a third frequency pattern substantially centered on the track at a third frequency, wherein the third frequency pattern overwrites at least part of the first and second frequency patterns;
after writing the third frequency pattern, scanning the head across the track while reading the disk to generate a read signal;
extracting a first frequency component from the read signal representing the first frequency; and
extracting a second frequency component from the read signal representing the second frequency.

41. The method as recited in claim 40, wherein the first frequency substantially equals the second frequency.

42. The method as recited in claim 40, wherein the first frequency is substantially different from the second frequency.

* * * * *